Oct. 13, 1959          E. R. PRISTO          2,908,084
INDICATING DEVICE FOR SIMULTANEOUSLY CHECKING
A PLURALITY OF DIMENSIONS OF ARTICLES
Filed Feb. 26, 1957
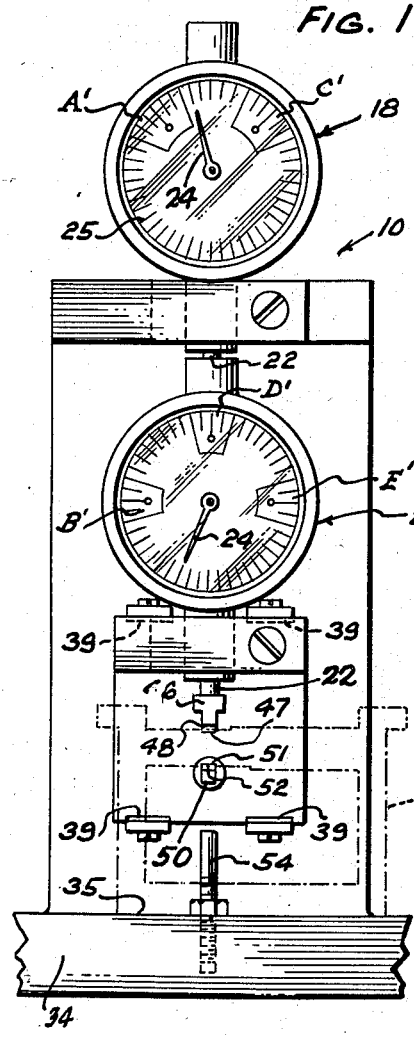
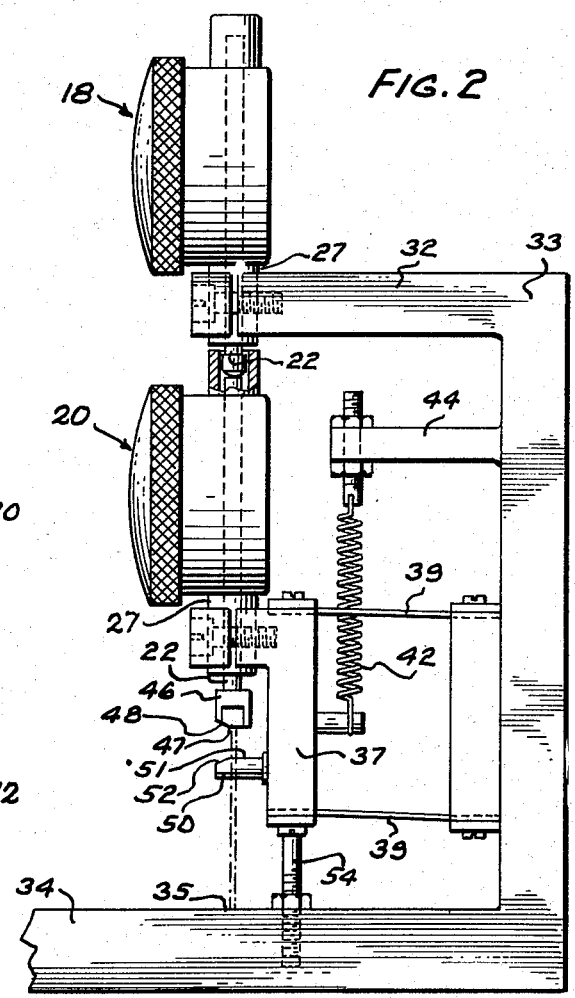
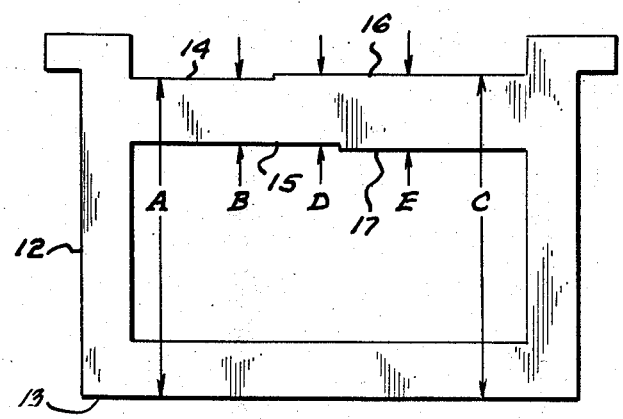
INVENTOR
E. R. PRISTO
BY
ATTORNEY United States Patent Office 2,908,084
Patented Oct. 13, 1959

2,908,084

INDICATING DEVICE FOR SIMULTANEOUSLY CHECKING A PLURALITY OF DIMENSIONS OF ARTICLES

Ervin R. Pristo, Westchester, Ill., assignor to Western Electric Company, Incorporated, New York, N.Y., a corporation of New York Application February 26, 1957, Serial No. 642,550

6 Claims. (Cl. 33—174)

This invention relates to devices for simultaneously checking a plurality of dimensions of articles and more particularly to an indicating device for simultaneously checking dimensions between a first surface and a second surface and between the second surface and a third surface of an article.

An object of the present invention is to provide a new and improved indicating device for simultaneously checking a plurality of dimensions of articles.

Another object of the present invention is to provide an improved indicating device for simultaneously checking the precise positions of a plurality of portions of an article relative to each other.

A device illustrating certain features of the invention for simultaneously checking the dimensions between a first surface and an second surface and between the second surface and a third surface of a card may include a pair of dial indicators disposed one above the other with the actuating rod of the lower indicator extending therethrough in abutting engagement with the actuating rod of the upper dial indicator, which latter is mounted on a frame in fixed relation to a gaging surface on the base thereof. The lower dial indicator is carried by a bracket which is floatingly mounted for vertical movement. A card to be checked is placed with the first surface thereof on the gaging surface of the base and the second surface in engagement with a contact point on the lower actuating rod thereby raising both rods and causing the upper one to actuate the upper stationary dial indicator to indicate the distance between the first and second surfaces of the card. A contact point mounted on the floating bracket engages the third surface of the card, is moved downwardly thereby, and moves the lower floating indicator dial relative to the actuating rod thereof to actuate the lower dial indicator which indicates the dimension between the second and the third surfaces of the card.

Other objects and advantages of the invention will become apparent by reference to the following detailed description and the accompanying drawings illustrating a preferred embodiment of the invention, in which Figs. 1 and 2 are front and side elevational views, respectively, of the indicating device for simultaneously checking a plurality of dimensions of a card; and Fig. 3 is a view of the card to be checked.

Referring to the drawings, the device 10 is designed to receive a card 12 in one position thereon to check simultaneously the dimension A and B between edges 13 and 14 and between edges 14 and 15, respectively; then to receive the card in a second position to check simultaneously the dimensions C and D between the edges 13 and 16 and between the edges 15 and 16, respectively. The card may be moved to a third position at which the device will check simultaneously the dimensions C and E between the edges 13 and 16 and between edges 13 and 17, respectively. The card 12 shown in Fig. 3 is a simplified diagrammatic version of operating cards used in wire spring relays in which the edges 14, 15, 16, 17 engage wire springs and space them in predetermined positions.

The device comprises a pair of dial indicators 18 and 20, each having an actuating rod 22 in the form of a rack which actuates gearing (not shown) operatively connected to a hand or pointer 24 which cooperates with numbered graduations 25 on the dial indicator to indicate the dimensions between various surfaces being checked. The dial indicators each have a tubular stem 27 which extends from the dial indicator and which may be engaged to support the dial indicators. The upper dial indicator 18 is fixedly secured to an arm 32 of a frame or standard 33 and is supported thereby in predetermined vertically spaced relation to the base 34 thereof and a gaging or contact surface 35 on the base. The lower dial indicator 20 is fixedly mounted on a floating bracket 37 which is secured to one end of a plurality of reeds or flat springs 39, the other ends of which are secured to the standard 33. A spring 42 connected at one end to a pin on the bracket 37 and at its other end to an arm 44 on the standard yieldably maintain the dial indicator 20 in a predetermined normal position with the upper end of the actuating rod 22 thereof in abutting engagement with the lower end of the actuating rod 22 of the upper dial indicator.

At its lower end the actuating rod 22 of the lower dial indicator 20 has a contact point 46 secured thereto which has a lower contact surface 47 engageable with the edges 14 and 16 of the card 12. A sloping surface 48 on the contact point 46 facilitates the movement of the card 12 into checking position in engagement with the contact surface 47. The floating bracket 37 has a contact point 50 thereon which has a gaging surface 51 engageable with the edges 15 and 17 of the card 12 and has a sloping surface 52 to facilitate the movement of the card 12 into checking position. A stop pin 54 on the base 34 is provided for limiting the downward movement of the floating bracket 37 and the lower dial indicator 20 thereon.

It will be understood that the dial indicators 18 and 20 and the contact surfaces 35, 47, and 51 are accurately adjusted to predetermined positions with the aid of a master gage, whereby the hands 24 in cooperation with the graduations 25 of the dial indicators accurately indicate the distance between the contact surfaces 35 and 47 and between the contact surfaces 47 and 51. Predetermined areas A' and C' on the upper dial indicator 18 and areas B' and D' and E' on the floating dial indicator 20 cover arcuate distances within which the hands 24 of the dial indicators must stop to indicate a card having dimensions which correspond to dimensions A, B, C, D, and E and which are within acceptable tolerance limits. These areas may be colored or delinated by lines as indicated in Fig. 1.

To check the distances A and B of the card 12 the card is placed with the edge portion 13 in engagement with the contact surface 35 on the base 34 of the device in substantially vertical alignment with the contact points 46 and 50 and moved to the right as viewed in Fig. 2 to cause the edges 14 and 15 to engage the sloping surfaces 48 and 52, separate the contact points 46 and 50, and move into engagement with the gaging surfaces 47 and 51. In response to upward movement of the contact point 46 from its normal position the actuating rods 22 of both of the dial indicators are simultaneously moved upwardly relative to the dial indicators and this upward movement of the upper actuating rod 22 effects the actuation of the hand 24 of the upper dial indicator to indicate the dimension A between the edges 13 and 14 of the card. As the card 12 moves the contact point 50 downwardly the floating dial indicator 20 is moved downwardly therewith relative to the actuating rod 22 thereof which effects the actuation of the hand 24 to indicate in cooperation with the graduations 25 the dimension B between edges 14 and 15 of the card.

The card 12 may then be moved to another position to engage the edges 16 and 15 with the contact surfaces 47 and 51, respectively, to cause the actuation of the device to indicate the dimensions C and D. The card 12 may then be moved to a third position in the device to engage the edges 16 and 17 with the contact surfaces 47 and 51 to actuate the dial indicators to indicate the dimensions C and E.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for simultaneously checking dimensions between a plurality of surfaces on articles, a plurality of dial indicators arranged in a row, said dial indicators having actuating rods extending therethrough in engagement and coaxial alignment with one another, a contact member mounted on the free end of one of the actuating rods and engageable with one portion of an article to be checked, a contact member for each of the dial indicators mounted in a predetermined position in fixed relation to its dial indicator and engageable with different portions of the article, and means for mounting the dial indicators and the actuating rods along a common axis and for relative movement between the dial indicators and the actuating rods and for relative movement between the several dial indicators in the direction of the common axis.

2. In a device for simultaneously checking dimensions between a plurality of surfaces of an article, a first dial indicator having a first rod extending therethrough for actuating it, a second dial indicator having a second rod extending therethrough for actuating it, a first contact element engageable with one surface of the article, means for mounting the first dial indicator and the first contact element in a predetermined spaced and fixed relation to each other and for mounting the second dial indicator between the first dial indicator and the first contact element for floating movement and with the actuating rods of the dial indicators in engagement and coaxial alignment with each other for simultaneous movement, a second contact rod on the second actuating member engageable with a second surface of the article, a third contact element engageable with a third surface of the article, and means for connecting the third contact element to the second dial indicator for movement therewith toward and away from the first and the second contact elements.

3. In a device for simultaneously checking the distances between first and second surfaces and between the second and third surfaces of an article, a frame having a first contact surface thereon engageable with the first surface of the article, a dial indicator mounted fixedly on said frame in a predetermined spaced relation to the first contact surface and having an actuating rod therethrough, a movable dial indicator having an actuating rod therethrough, means on the frame for mounting the movable dial indicator for floating movement between the other dial indicator and the first contact surface and with the actuating rods of the dial indicators in engagement and coaxial alignment with each other for movement together, a contact surface on the actuating rod of the movable dial indicator engageable with the second surface of the article, and a contact carried by the movable dial indicator having a third contact surface disposed between the first and the second contact surfaces and engageable with the third surface of the article.

4. In a device for simultaneously checking the position of different portions of an article, a plurality of dial indicators each having an actuating rod therethrough, a plurality of contact members, one for each of the dial indicators having contact surfaces engageable with different portions of the article to be checked, means for mounting each of the contact members individually in a predetermined fixed relation to its dial indicator, means for mounting the dial indicators in a row for relative movement between them in a direction parallel to said row and with the actuating rods disposed parallel to said direction in engagement and coaxial alignment with each other for movement together in said direction, and a contact on the free end of one of the actuating rods having a contact surface engageable with another portion of the article.

5. A device for simultaneously checking the position of three surfaces of an article comprising a frame including a base having a first gaging surface engageable with a first surface of the article, a pair of dial indicators each having an actuating rod extending therethrough, means on the frame for securing one of dial indicators in a predetermined fixed and spaced relation to said first gaging surface and with the actuating rod disposed for movement along a predetermined axis toward and from said first gaging surface, means on the frame for mounting the other dial indicator for floating movement along said axis and with the actuating rod thereof disposed in coaxial alignment and engagement with the actuating rod of said one dial indicator for movement therewith, means on the actuating rod of the movable dial indicator having a second gaging surface engageable with a second surface of the article, and means carried by the movable dial indicator having a third gaging surface engageable with a third surface of the article.

6. In a device for simultaneously checking the position of three surfaces of an article comprising a first gaging element engageable with a first predetermined surface of the article, a second gaging element engageable with a second predetermined surface of the article, a third gaging element engageable with a third predetermined surface of the article, a first indicator having an actuating rod extending therethrough, a second indicator having an actuating rod extending therethrough, mounting means for supporting the first gaging element and the first indicator in a predetermined spaced and fixed relation to each other and with the actuating rod of the indicator disposed for movement along a predetermined axis toward and from the first gaging element, means on said mounting means for supporting the second indicator for floating movement along said axis and with the actuating rod thereof in engagement and coaxial alignment with the actuating rod of the first actuator for movement therewith, said second gaging element being mounted on the actuating rod of the second indicator for movement therewith, and means attached to the second indicator for supporting the third gaging element in a predetermined position for movement with said indicator.

References Cited in the file of this patent

UNITED STATES PATENTS

| | | |
|---|---|---|
| 2,080,941 | Hutchinson | May 18, 1937 |
| 2,177,399 | Aller | Oct. 24, 1939 |
| 2,470,004 | Trame | May 10, 1949 |
| 2,492,369 | Robins | Dec. 27, 1949 |
| 2,746,159 | Aller | May 22, 1956 |
| 2,763,934 | Creek | Sept. 25, 1956 |
| 2,784,495 | Croshier | Mar. 12, 1957 |